May 22, 1962

C. C. DE PEW 3,035,734

FILLER CAP ASSEMBLY

Original Filed July 17, 1957

INVENTOR.
CHESTER C. DE PEW
BY John P. Chandler
HIS ATTORNEY.

3,035,734
FILLER CAP ASSEMBLY
Chester C. De Pew, Farmingdale, N.Y., assignor to Chester Corporation, Wilton, Conn., a corporation of Connecticut
Original application July 17, 1957, Ser. No. 672,474. Divided and this application June 20, 1960, Ser. No. 37,532
2 Claims. (Cl. 220—24.5)

This invention relates to closures for vessels containing fluids and relates more particularly to an improved closure assembly for use in tanks such as those used in aircraft which are normally maintained under positive pressure. This application is a division of my co-pending application, Serial No. 672,474, filed July 17, 1957, now Patent No. 2,967,637, issued January 10, 1961.

An important object of the present invention is the provision of a closure for the filling opening of a tank which provides a positive air-tight seal for the tank when the closure is locked but which permits the closure to become unlocked by the simple act of raising a manipulating handle, pivoted on a rotatable stud and clamping member, from its closed position in substantially flush relation with the closure plate, to a vertical position, and then rotating the handle and stud something less than one-quarter turn.

A further object of the invention is to provide an improved filler cap having camming means at the inner end of the manipulating handle, which, upon raising the handle, breaks the seal and effectively vents any pressures in the tank which are higher than atmospheric pressure. Until the handle and stud are rotated on the axis of the latter the cap cannot be removed and this prevents the possibility of the cap being blown into the face of the operator upon the initial unlocking action.

Another object of the invention is to provide improved means for limiting rotation of the clamping member and the manipulating handle carried thereby.

A further object of the invention is to provide a novel cap of inexpensive construction and consisting essentially of a closure plate and a clamping plate, both formed of die castings, and an O ring retaining plate stamped from sheet metal, none of which plates require any machining.

Another object of the invention is to provide a novel closure assembly having an O ring at the outer periphery of the closure plate and wherein improved means for mounting the O ring are provided. This resilient O ring has a fixed cross-sectional diameter when it is first installed and this diameter increases or decreases depending upon ambient temperatures and the nature of the fluids contained within the tank. The annular recess for the O ring is such that areas are provided to receive the greater volume of the rubber upon expansion of the ring without affecting its sealing qualities and the seal is similarly unaffected by maximum contraction or shrinking of the ring. The annular seat is also so formed that pressures developed within the tank cannot blow the O ring out of its seat.

Figure 1:
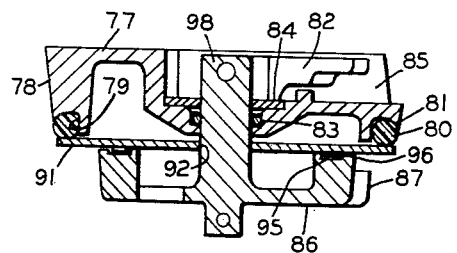
FIG. 1 is a central section taken through a filler cap embodying the present invention.
Figure 2:
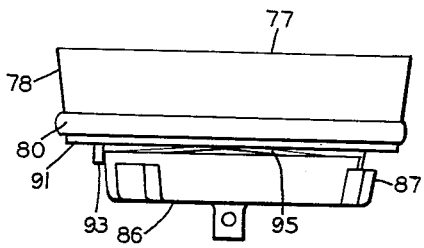
FIG. 2 is a side elevation thereof.

The closure assembly includes a closure plate 77 whose outer periphery 78 has a straight bevel and a recess 79 for the outer O ring 80. A downwardly extending shoulder 81 acts to confine the O ring. The recess 85 for the handle extends clear to the outer periphery of the closure plate.

The clamping plate 86 is formed with the clamping fingers 87 extending from the lower outer periphery thereof. This outer periphery is formed with two recesses 88, each recess forming two shoulders 89 and 90, the latter of which is aligned with one face of clamping fingers 87. Although two of such recesses are shown three may be provided. The central stud portion 98 is pivoted in the closure plate. The plate 91 for retaining the outer O ring in the groove is flat clear to its perimeter and has a central opening 92 which receives the stud. This central mounting prevents lateral movement of the retainer plate and provides a suitable pilot for guiding the closure into the adapter. During movement of the closure into the adapter true axial alignment of the former is maintained at all times and binding is a virtual impossibility.

Figure 3:
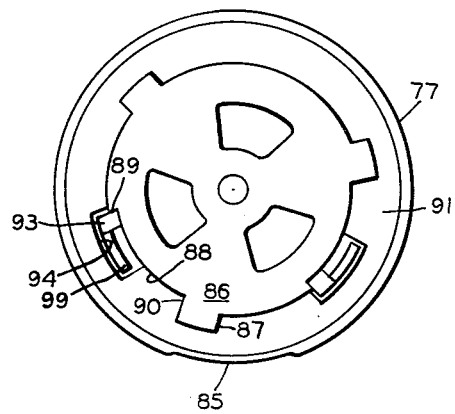
FIG. 3 is a bottom plan view and showing the position of the clamping plate when the parts are in locked position.
Figure 4:
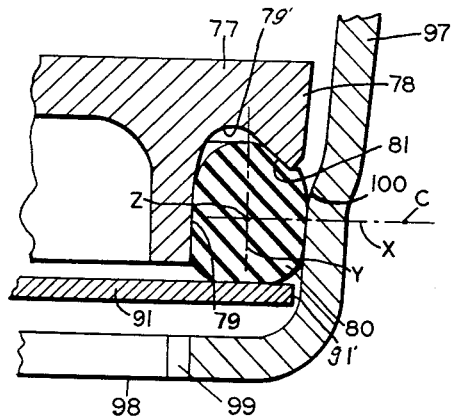
FIG. 4 is an enlarged broken section taken through cap and adapter plate to show the position of the O ring when in sealing relation.

The closure plate has a number of downwardly extending lugs 93 which pass through openings 94 in retainer plate 91. Each lug 93 is of sufficient width (extending in a radial direction) to extend into recess 88 and can thus abut against shoulder 89 or 90 on the clamping plate, which shoulders act as stops. In the position shown in FIG. 3 lug 93 abuts against shoulder 89 which is the position the fingers 87 of the clamping plate occupy when the cap assembly is in locked position on the adapter. The lug further has an arcuate extension 99 of lesser width than the lug and when the clamping plate is rotated clockwise from the position of FIG. 3 and shoulder 90 contacts lug 93 clamping finger 87 becomes nested in lug extension 99 which is of substantially the same length as the clamping finger. A wavy washer 95 is positioned between the clamping plate and the retainer plate. Walls 96 prevent lateral movement of the washer and when the clamping plate is rotated to a point wherein clamping fingers 87 and shoulders 90 contact lugs 93 the closure is ready for application to adapter ring 97 shown in FIG. 4 and which has a lower horizontal flange 98 against which the clamping fingers 87 react in order to move the closure plate downwardly and the O ring outwardly against the adapter ring with its special contour. Flange 98 has spaced slots 99 through which the fingers 87 may go before clamping plate 86 is rotated by the handle.

In cross-section the adapter ring 97 has a curved annular surface 100 forming the arc of a circle whose center is point C and the horizontal line X passes through this point. This line is intersected by vertical line Y and point Z of intersection forms the center of the O ring. This curved annular surface arcuate in cross-section, extends downwardly as far as horizontal line X and below this line it is substantially straight, and parallel with the axis at least in the area contacted by the O ring.

It will be noted that the upper curved section 79' of annular recess 79 has space for cross-sectional expansion of O ring 80. It will also be clearly seen that retainer plate 91 has a sufficiently large diameter so that its outer periphery 91' is closely spaced from the adapter so that the plate acts as a pilot to properly center the ring as it is being inserted into the adapter.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning

I claim:

1. The combination of a filler cap for a tank and an apertured adapter therefor, said adapter being provided with an annular flange which is downwardly and inwardly curved, a vertical annular section below the inwardly curved section, a generally flat horizontal apertured section at the lower end of the flange, said latter section having a plurality of slots extending radially outwardly from its inner periphery, said cap including a closure plate having an outer periphery which is tapered inwardly from the upper to the lower end thereof, said plate further having a central aperture and an outwardly and downwardly opening annular groove at the lower end of said outer periphery, and a resilient O ring in said groove, the upper end of said groove being substantially C-shaped in cross section and of such size as to provide a space into which the O ring can expand, and a retainer plate engaging the lower annular edge of the ring to confine it within the groove, said plate being flat clear to its perimeter, the downwardly curved annular flange of the adapter, in cross-section, forming the arc of a circle whose center is located outside the ring but is on substantially the same horizontal plane as the center of the O ring, which latter engages said curved flange when the cap is in closed position, and a rotatable clamping plate carried by the closure plate and provided with clamping fingers which underlie the slotted adapter ring, a stud portion extending upwardly from the center of the clamping plate and through the central aperture of the closure plate, a handle pivoted at the upper end of the stud portion and provided with a camming surface which engages the closure plate and which, when the handle is rotated from open position, where it is substantially vertical, to closed position where it is flat against the closure plate, simultaneously urges the fingers upwardly against the O ring retainer plate and the closure plate downwardly to compress the O ring against the curved flange, the retainer plate having a diameter only slightly less than the diameter of the adjacent section of the adapter so as to act as a pilot for the filler cap as it is moved into the adapter.

2. The structure recited in claim 1 wherein the closure plate is provided with lugs which extend below the retainer plate and which have recesses on one side thereof to receive the clamping fingers in nested relation when they pass through the slotted ring and form a stop limiting rotation in one direction, and a shoulder on the clamping plate which engages one of said lugs to limit rotation in the opposite direction.

References Cited in the file of this patent

UNITED STATES PATENTS

| | | |
|---|---|---|
| 2,616,584 | Rausenberger et al. | Nov. 4, 1952 |
| 2,839,215 | De Pew | June 17, 1958 |
| 2,967,637 | De Pew | Jan. 10, 1961 |

FOREIGN PATENTS

| | | |
|---|---|---|
| 368,214 | Germany | Feb. 2, 1923 |
| 808,830 | France | Nov. 24, 1936 |